(12) United States Patent
Musayev et al.

(10) Patent No.: US 7,747,894 B2
(45) Date of Patent: Jun. 29, 2010

(54) TRANSPORT-NEUTRAL IN-ORDER DELIVERY IN A DISTRIBUTED SYSTEM

(75) Inventors: Eldar A. Musayev, Sammamish, WA (US); Jean-Emile Elien, Bellevue, WA (US); Kartik Paramasivam, Redmond, WA (US); Kevin Bowen Smith, Fleet (GB); Lee B. Graber, Kirkland, WA (US); Sanjib Saha, Bothell, WA (US); Satish R. Thatte, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 828 days.

(21) Appl. No.: 11/146,644

(22) Filed: Jun. 6, 2005

(65) Prior Publication Data

US 2006/0274727 A1     Dec. 7, 2006

(51) Int. Cl.
*G06F 11/00* (2006.01)

(52) U.S. Cl. .................. 714/4; 709/219; 709/231; 714/749

(58) Field of Classification Search .............. 714/4, 714/749; 709/219, 231
See application file for complete search history.

(56) References Cited

U.S. PATENT DOCUMENTS

| | | | | |
|---|---|---|---|---|
| 5,410,536 A * | 4/1995 | Shah et al. | ............. | 370/216 |
| 5,410,650 A * | 4/1995 | Sasaki et al. | ............. | 709/250 |
| 5,937,168 A * | 8/1999 | Anderson et al. | ............. | 707/3 |
| 6,016,394 A * | 1/2000 | Walker | ............. | 717/104 |
| 6,031,818 A * | 2/2000 | Lo et al. | ............. | 370/216 |
| 6,049,889 A * | 4/2000 | Steely et al. | ............. | 714/4 |
| 6,687,848 B1 * | 2/2004 | Najmi | ............. | 714/4 |
| 6,724,747 B1 * | 4/2004 | Arango et al. | ............. | 370/352 |
| 6,744,765 B1 * | 6/2004 | Dearth et al. | ............. | 370/394 |
| 6,748,508 B1 * | 6/2004 | Khandelwal et al. | ............. | 711/170 |
| 6,751,673 B2 * | 6/2004 | Shaw | ............. | 709/231 |
| 6,813,653 B2 * | 11/2004 | Avery | ............. | 710/22 |
| 6,886,029 B1 * | 4/2005 | Pecus et al. | ............. | 709/203 |
| 6,931,569 B2 * | 8/2005 | Fong et al. | ............. | 714/18 |
| 6,934,249 B1 * | 8/2005 | Bertin et al. | ............. | 370/218 |
| 6,983,395 B2 * | 1/2006 | Chen et al. | ............. | 714/4 |
| 7,007,088 B1 * | 2/2006 | Najmi | ............. | 709/225 |
| 7,099,337 B2 * | 8/2006 | Pinto | ............. | 370/400 |
| 7,234,083 B2 * | 6/2007 | Chheda et al. | ............. | 714/47 |
| 7,290,051 B2 * | 10/2007 | Dobric et al. | ............. | 709/224 |
| 7,296,192 B2 * | 11/2007 | Breitling et al. | ............. | 714/49 |
| 7,302,618 B1 * | 11/2007 | Shafer et al. | ............. | 714/48 |
| 7,308,617 B2 * | 12/2007 | Artobello et al. | ............. | 714/55 |
| 7,324,555 B1 * | 1/2008 | Chen et al. | ............. | 370/468 |
| 7,345,999 B2 * | 3/2008 | Su et al. | ............. | 370/231 |

(Continued)

*Primary Examiner*—Robert Beausoilel
*Assistant Examiner*—Joshua P Lottich
(74) *Attorney, Agent, or Firm*—Woodcock Washburn LLP

(57) ABSTRACT

A transport-neutral in-order delivery in a distributed environment is provided. Typically, in-order delivery guarantees that sequential orders received by a transport engine are sent out in the same order they are received. Such delivery may be forwarded either to another transport engine or to some application. In case there is a failure of delivery of messages in a stream, the messages are either resubmitted, suspended, or moved to backup. A user or administrator can configure the desired action. Additionally, any stream can be manually aborted or a specified port can be unenlisted. Deliverable streams of messages are locked on to a back-end transport engines or applications and dequeued sequentially unless one of the above mentioned failure scenarios occurs.

20 Claims, 12 Drawing Sheets

U.S. PATENT DOCUMENTS

| | | | |
|---|---|---|---|
| 7,584,404 B2* | 9/2009 | Kozintsev et al. | 714/776 |
| 7,644,307 B2* | 1/2010 | Musoll | 714/18 |
| 2002/0049746 A1* | 4/2002 | De Roose | 707/1 |
| 2002/0107903 A1* | 8/2002 | Richter et al. | 709/201 |
| 2002/0146096 A1* | 10/2002 | Agarwal et al. | 379/88.13 |
| 2003/0009511 A1* | 1/2003 | Giotta et al. | 709/201 |
| 2003/0101367 A1* | 5/2003 | Bartfai et al. | 714/4 |
| 2003/0212818 A1* | 11/2003 | Klein et al. | 709/238 |
| 2003/0236919 A1* | 12/2003 | Johnson et al. | 709/251 |
| 2004/0044776 A1* | 3/2004 | Larkin | 709/228 |
| 2004/0045030 A1* | 3/2004 | Reynolds et al. | 725/110 |
| 2004/0078601 A1* | 4/2004 | Tengwall et al. | 713/201 |
| 2004/0081202 A1* | 4/2004 | Minami et al. | 370/469 |
| 2004/0136325 A1* | 7/2004 | Dobric et al. | 370/241 |
| 2004/0193733 A1* | 9/2004 | Vangal et al. | 709/250 |
| 2004/0240388 A1* | 12/2004 | Albion et al. | 370/252 |
| 2004/0267935 A1* | 12/2004 | Patiejunas | 709/227 |
| 2005/0081080 A1* | 4/2005 | Bender et al. | 714/2 |
| 2005/0216421 A1* | 9/2005 | Barry et al. | 705/64 |
| 2005/0223108 A1* | 10/2005 | Maffeis et al. | 709/232 |
| 2006/0095589 A1* | 5/2006 | Seto | 709/246 |
| 2006/0161646 A1* | 7/2006 | Chene et al. | 709/223 |
| 2006/0206774 A1* | 9/2006 | Park et al. | 714/749 |
| 2007/0005743 A1* | 1/2007 | Herzog | 709/223 |
| 2007/0104096 A1* | 5/2007 | Ribera | 370/229 |
| 2007/0162811 A1* | 7/2007 | Matsumoto | 714/749 |
| 2008/0052404 A1* | 2/2008 | Leighton et al. | 709/231 |
| 2008/0056253 A1* | 3/2008 | Minami et al. | 370/389 |
| 2008/0222243 A1* | 9/2008 | Shaw | 709/203 |

* cited by examiner

TRANSPORT-NEUTRAL IN-ORDER DELIVERY IN A DISTRIBUTED SYSTEM

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2005, Microsoft Corp.

TECHNICAL FIELD

The present aspects discussed herein generally relate to the field of information processing. More specifically, they relate to transporting in a neutral manner ordered information.

BACKGROUND

It is desirable for certain information to be processed in the order in which it is sent at one end and received at another end. For example, regarding stock purchases, if two customers place an order at a brokerage firm to buy stock from a stock market, it is desirable to have a first customer who placed a first order to have her purchase order of stock to occur before the second customer who placed a second purchase order. Given that the prices of stock fluctuate on the stock market and that purchase orders affect the price of stocks, and moreover, the timing of a purchase can have important financial consequences, the first purchase order of stock that is sent over some medium, such as the Internet, should be processed first, and the second order of stock should be processed second. Thus, the order or purchases should be preserved at one end (the stock market) when it arrives from some previous destination (the brokerage firm). This order preservation not only is desirable in the context of the stock market, but also applies to banking and other fields where information order preservation may be important.

Furthermore, not only is the preservation of information order important, but given the variety of transport media and their accompanying protocols, it is also desirable to be able to process information that is transmitted in different forms using a variety of different means. Put another way, it is desirable to be able to handle such information in a neutral manner, not relying on any specific transport medium or protocol. Thus, in one instance it may be desirable to use the Internet and hypertext transfer protocol (HTTP) to place a stock order, and in another instance it may be desirable to use a telephone system and its accompanying keypad to place a stock order. Even within a designated medium, such as the Internet, it may be more desirable to use one protocol over another, such as using file transfer protocol (FTP) over HTTP—for whatever desired reasons.

Given these goals and the complexity of information flow, error handling situations should to be addressed. In the case of stock orders, or more broadly, in case of any messages that are to be transmitted from one end to another end, if something goes wrong, handlers that deal with any arising problems should be in place to ensure that information flow does not break down and that information order is preserved.

These handlers need not only function correctly between two endpoints, but also in a distributed environment. In a distributed environment, where there may be dozens of servers and corresponding applications, error handling becomes especially complicated. Information can travel in various paths, and in case something goes wrong, it is often difficult to fix any desired transmittal and subsequent processing of such information. Thus, it would be desirable to have various error handling scenarios that are capable of functioning in a transport-neutral manner when information should be in-order while it is transmitted in a distributed environment.

SUMMARY

Transport-neutral in-order information delivery is provided. A transport engine is provided, where the transport engine receives in-order information and sends in-order information. In one aspect, the in-order information is encapsulated in the form of a stream that contains at least one message. Moreover, a port is coupled to the transport engine and it allows for the sending of the in-order information from the transport engine to a designated destination, which may include either another transport engine or an application that resides on the same server as the transport engine.

In the case of in-order messages that are transferred from the transfer engine port to some other designated destination, using any transport adapter chosen in a neutral manner, the stream of in-order information is locked on the designated destination and no other transport engine or application accesses the stream. If there is failure of message delivery from the transport engine to the designated destination, an error handling mechanism residing in the transport engine is invoked. The error handling mechanism takes at least one action in case of message failure: (1) resubmission of the message to the designated destination after a specified event; (2) suspension of the message from delivery to the designated destination; or (3) moving of the message to a backup destination. Additionally, either upon such an error or based on some selection, an administrator can unenlist a receiving port at the designated destination and prevent sending the in-order information to the receiving port; or alternatively, a stream can be completely aborted. Upon this event, the lock on the stream is released.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description, is better understood when read in conjunction with the appended drawings. In order to provide useful illustrations, various aspects are shown. However, these aspects are not limiting to the specific aspects disclosed. Instead, the following exemplary figures are included.

DETAILED DESCRIPTION OF ILLUSTRATIVE ASPECTS

Overview

Aspects of transport-neutral in-order delivery in a distributed system are provided. Specifically, in-order delivery is discussed that guarantees that sequential orders received by a transport engine will be sent out in the same order either to another transport engine or to some application. In case there is a failure of delivery, messages in a stream are either resubmitted, suspended, or moved to backup. Additionally, any stream can be manually aborted or a specified port can be unenlisted. Deliverable streams of messages are locked on to a back-end transport engine or application and dequeued sequentially unless one of the above mentioned failure scenarios occurs.

Additionally, since in-order and transport neutral delivery is often implemented in a distributed system—although to function it does not have to be—an exemplary distributed system is briefly discussed.

Aspects of Transport-Neutral in-Order Delivery in a Distributed System

In one aspect, a typical scenario is presented where information may have to be processed in the ordered it was received. Thus, in FIG. 1, three customers A 102, customer B 104, and customer C 106 are depicted. Each of these customers may submit some purchases order, for example, for a stock lot on a stock exchange 112. The order of these purchase orders is important because orders from customers and the timing of the stock exchange 112 have an impact on the stock price of stocks offered on the stock exchange 112.

Figure 1:
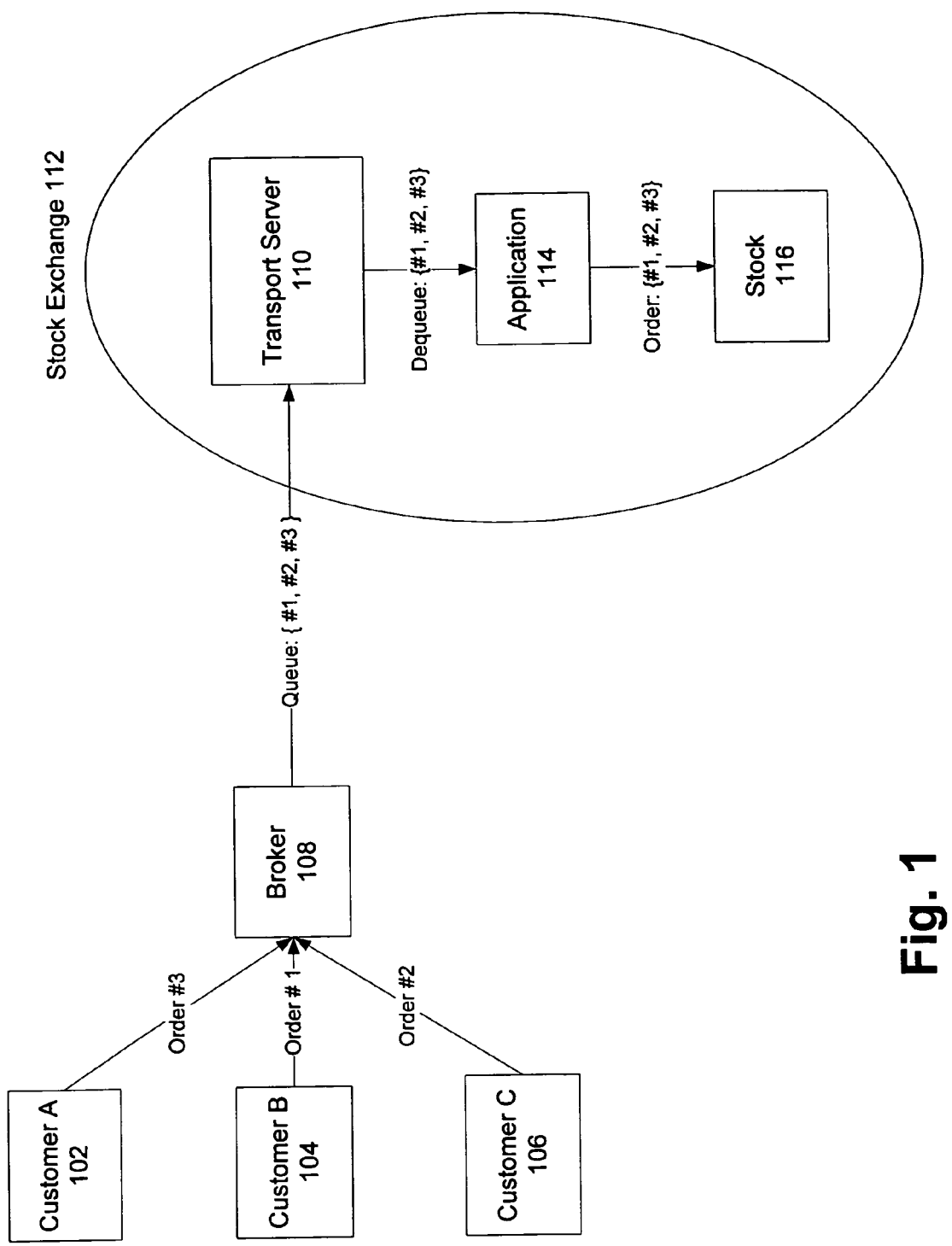
FIG. 1 presents an overview of in-order processing, where information order at one end is preserved at another end, as for example may be the case of stock orders sent from a brokerage firm to a stock exchange.

In the illustrated scenario in FIG. 1, customer B 104 actually makes the first order (order #1) to a broker 108. This customer B 104 is followed by customer C 106 and then customer A 102, who make second and third orders, respectively. The order or sequence of these orders, namely, order #1, then order #2, then order #3 is important to preserve so these orders are enqueued in the temporal order they were submitted and forwarded to some transport engine or server 110. A transport engine is exemplified by having the ability to transport information to another designated destination in the same order in which it receives the information, and being able to do so using various protocols (as is discussed in more detail, below).

Upon receipt of these orders, the transport server 110 dequeues these orders in the sequence in which it received them to some application 114. This application 114 may then actually perform the stock 116 purchases. Alternatively, as will become apparent from the other figures, the sequenced orders may also be dequeued to another transport server (not pictured) and be further relayed to other servers or applications in a distributed environment.

An important aspect that FIG. 1 illustrates is that the transport server 110 ensures that whatever information it receives in enqueued fashion, it will dequeue in the same sequence. Or, more specifically, the transport server 110 ensures that it will relay the sequential ordering of information from the broker 108 to the application 114 in the same sequence. This sequential integrity assurance by the transport server 110 allows information to remain in-order as it is transmitted across various media.

Figure 2:
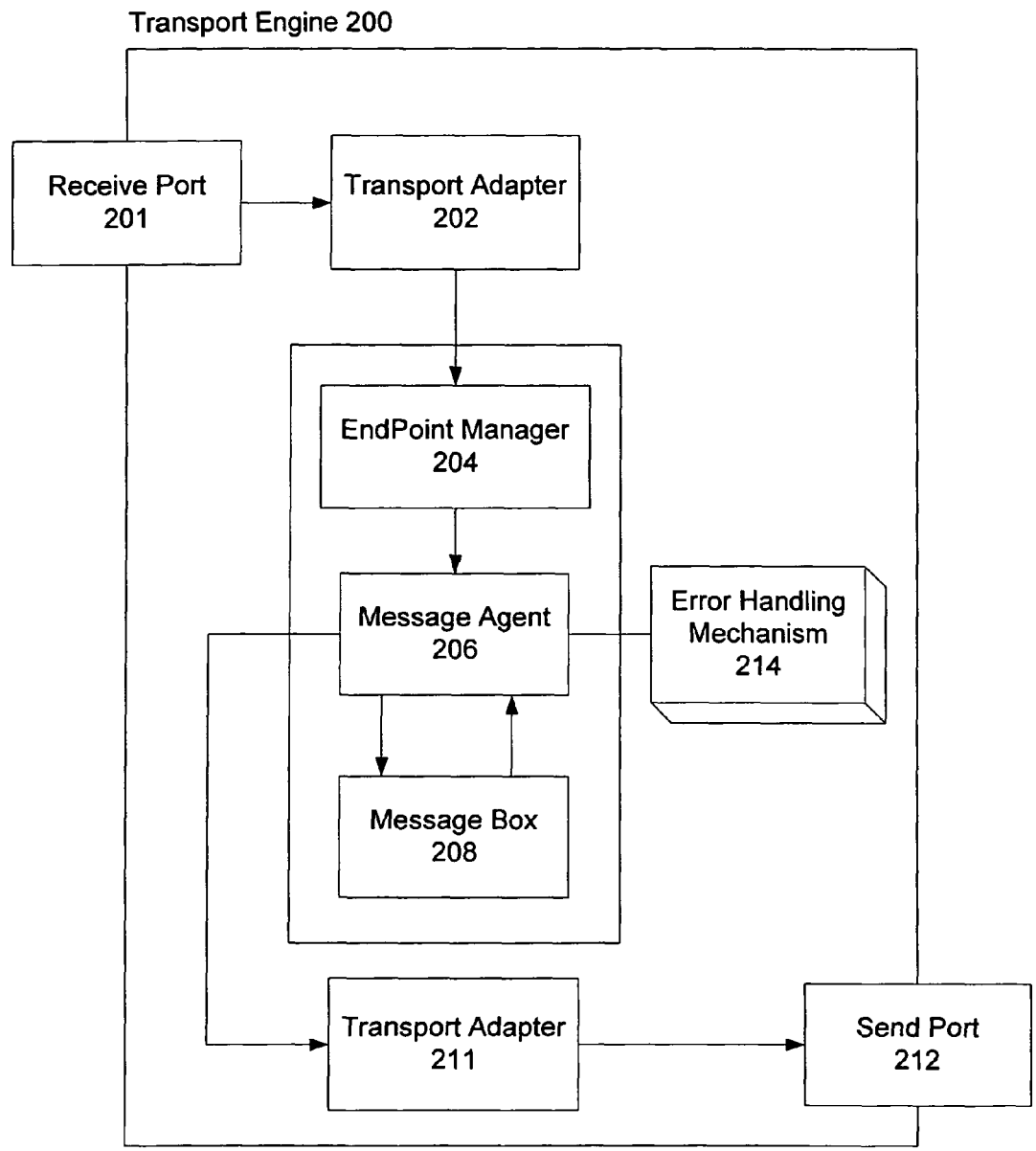
FIG. 2 presents an overview of in-order transport-neutral processing, where the transport is neutral with respect to the type of adapter and protocol that are used and can subsequently function with a server.

FIG. 2 specifically focuses on the transport engine or server discussed directly above. The transport engine 200 has at least two ports: a receive port 201 and a send port 212, with which it can receive information and send information, respectively. The received information is interpreted by some transport adapter 202 that understands the protocol accompanying the received information. Information can be sent using a variety of protocols (which are discussed in FIG. 3B).

The transport adapter 202 then relays the received information to an endpoint manager 204 which processes the information. The endpoint manager 204, in turn, presents this received information to a message agent 206 which pushes the information to a message box 208. The message box 208 can be a queue that is logically partitioned so that each partition corresponds to some endpoint which may be located downstream of the information flow.

The information can then be popped off of the message box 208 and back to the message agent 206 and relayed to a transport adapter 211 to be encoded with some protocol. This information is then sent (or put another way, it is dequeued) via a send port 212 either to some application or transport engine in some network. The transport engine 200, as mentioned above, guarantees that the order in which information is received 201 will be preserved when the information is sent 212. This is an especially difficult task to accomplish given that thousands of streams may be received by the receive port 201 in a short period of time and that failure scenarios may arise during this period of time.

Failure scenarios are handled by an error handling mechanism 214. This mechanism can perform various tasks in case information is not transferred properly (the error handling scenarios are discussed in more detail below, especially with respect to FIGS. 6-8). For example, the error handling mechanism can resubmit information that did not deliver properly to some back-end destination, or it can suspend the information so that it is placed on hold for some desired period of time, or it can even move such information to a backup destination. These are but exemplary error handling scenarios, and other equivalent scenarios can be handled by the error handling mechanism 214.

Figure 3A:
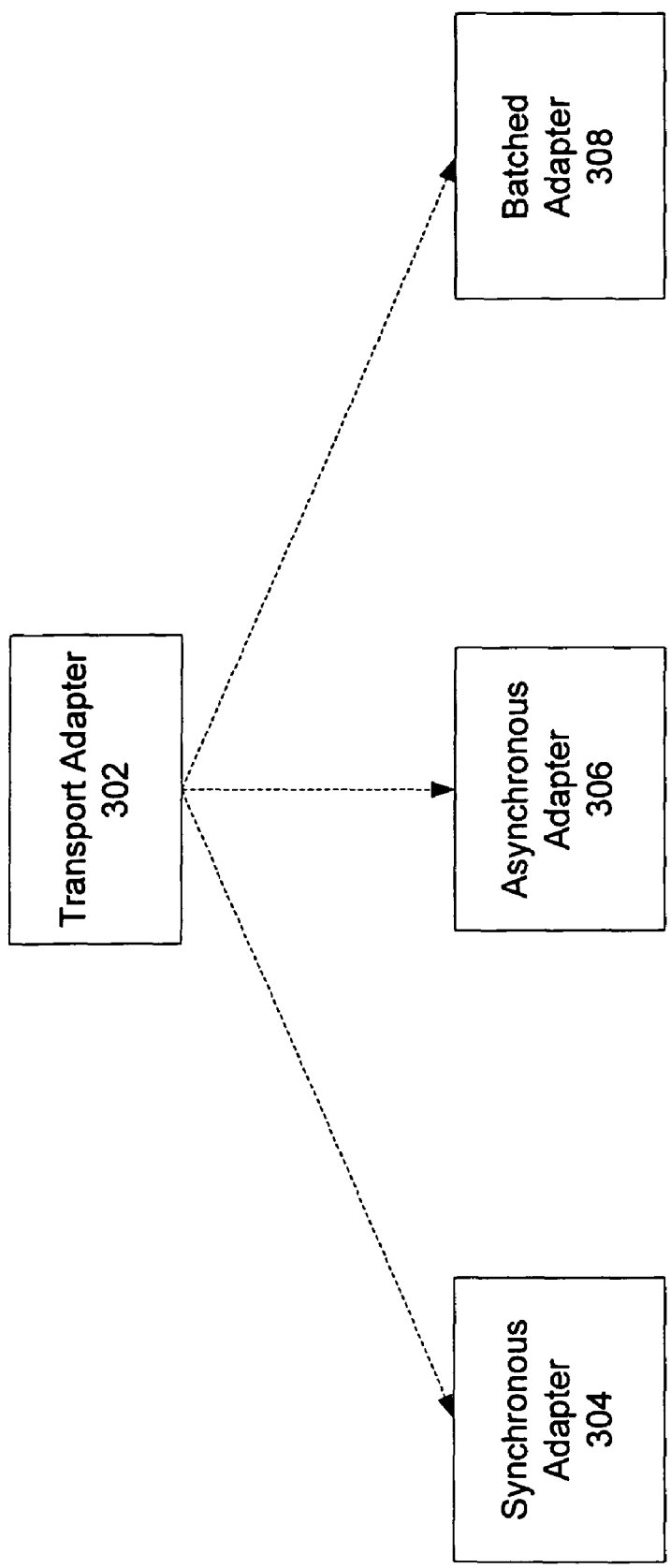
FIG. 3A presents transport adapter characteristics, which include synchronous adapters, asynchronous adapters, and batched adapters.

Aside from preserving the order of information, the transport engine 200 of FIG. 2 also guarantees that information is transferred in a neutral manner. Put another way, the transfer engine 200 does not require the use of any specific transport adapter. In fact, FIG. 3A illustrates that a transport adapter 302, depicted both on the receive side and the send side in FIG. 2 can have various characteristics. For example, a transport adapter 302 can be synchronous 304 in that when it sends a message to some endpoint, it waits for confirmation that the message was sent successfully and then proceeds with the next message.

However, a transport adapter can also be asynchronous 306 in that it does not necessarily have to wait for confirmation from an endpoint and thus it does not necessarily know whether the message was sent successfully. Last, a transport adapter 302 can also be batched 308 in that a batch of messages can be send from one send port to another receive port (or some application). After the batch is received confirmation can be sent that the messages were received successfully.

These are but only three examples of the transport adapter 302 characteristics the transport engine of FIG. 2 can employ. The engine itself is agnostic with respect to any particular transport adapter and can actually support all three (and others not discussed here but appreciated by those skilled in the art).

Figure 3B:
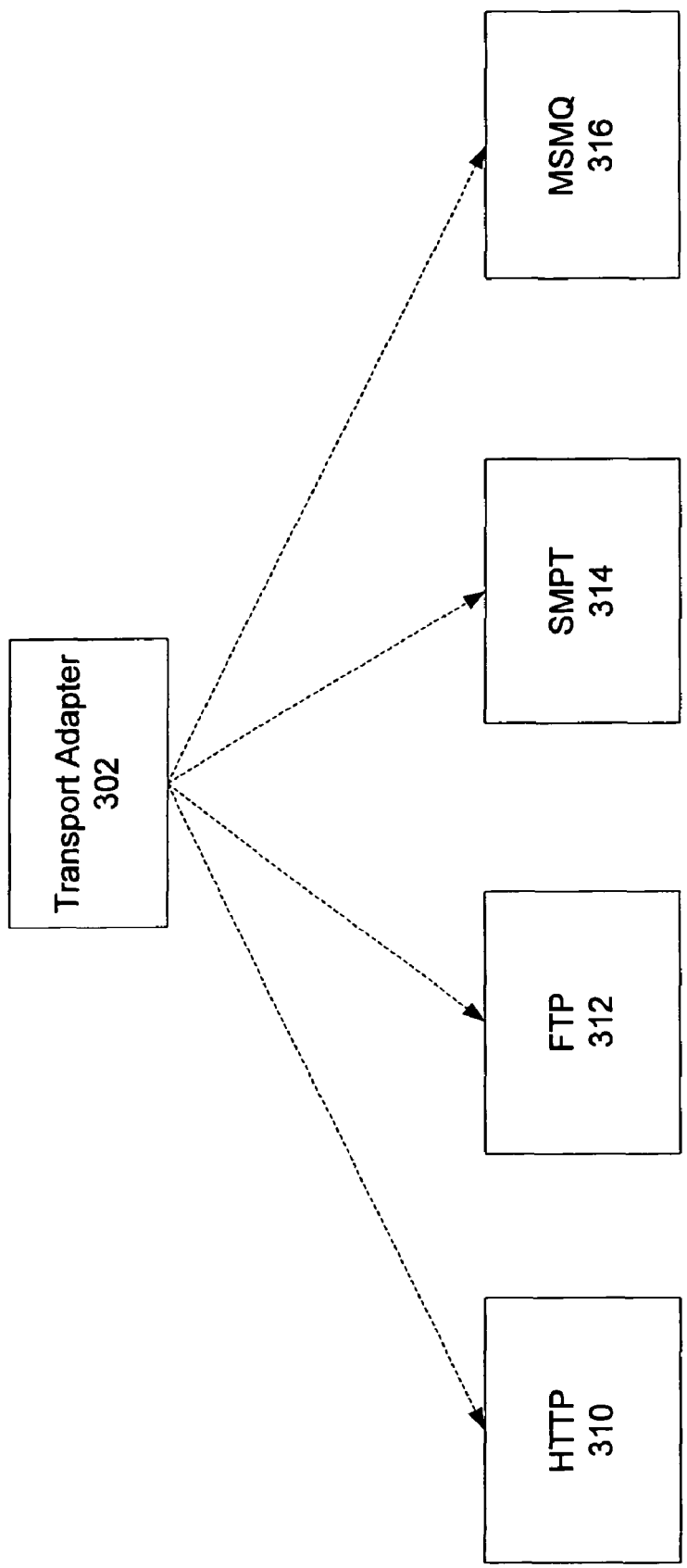
FIG. 3B presents the types of transport adapters that are available, such includes adapters based on FTP, HTTP, SQL, and MSNQ.

In another aspect, FIG. 3B illustrates the types of adapters that may be used in order to support a variety of protocols. For example, the transport adapter supports hypertext transfer protocol (HTTP) 310, file transfer protocol (FTP) 312, simple mail transfer protocol (SMTP) 314, and Microsoft message queuing (MSMQ) 316. Of course other protocols, like simple object access protocol (SOAP), can be supported. The illustrated protocols are just exemplary, and are not meant to be limiting. The transport engine is neutral with respect to any kind of protocol and supports them all. Thus, the transport adapter 302 can be thought of as an abstraction that subsumes all the available transport adapters capable of handling information transfer.

Figure 4:
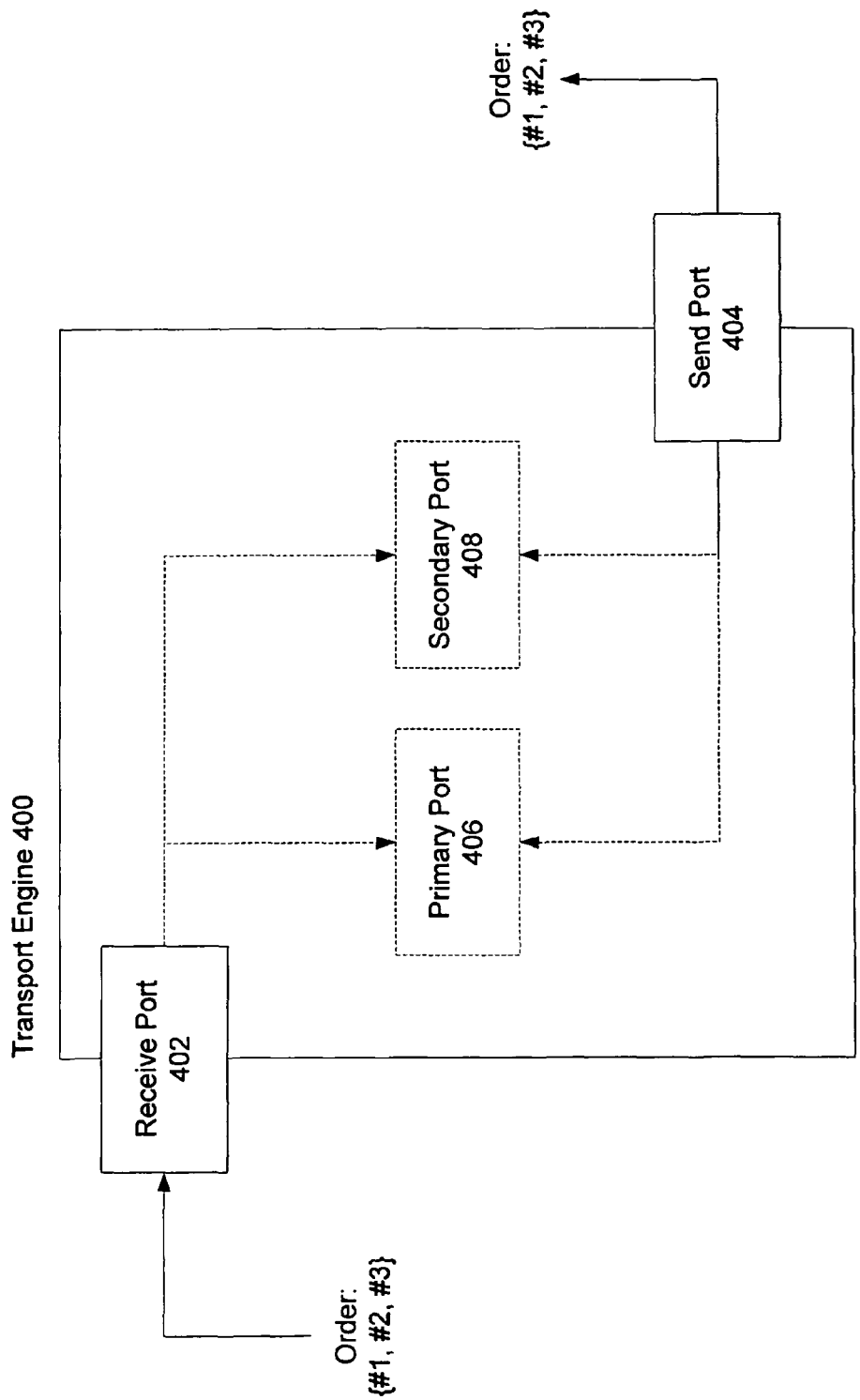
FIG. 4 presents transport-neutral processing port types, where an information transport engine can be a primary port and a secondary port, either at the receive side or the send side.

In another aspect, as shown in FIG. 4, the transport engine 400 has ports with both a primary port and a secondary port. Thus for example, the receive port 402 has a primary port 406, which may be supported by a protocol like HTTP or MSMQ, and a secondary port 408, which may be supported by a protocol like FTP or SMTP. Upon the failure of the primary port 406, the secondary port 408 is activated. As will be discussed below, a port switch from a primary port to a secondary port may have impact on the sequential order of messages being dequeued by a send port to some other receive port or application.

Figure 5:
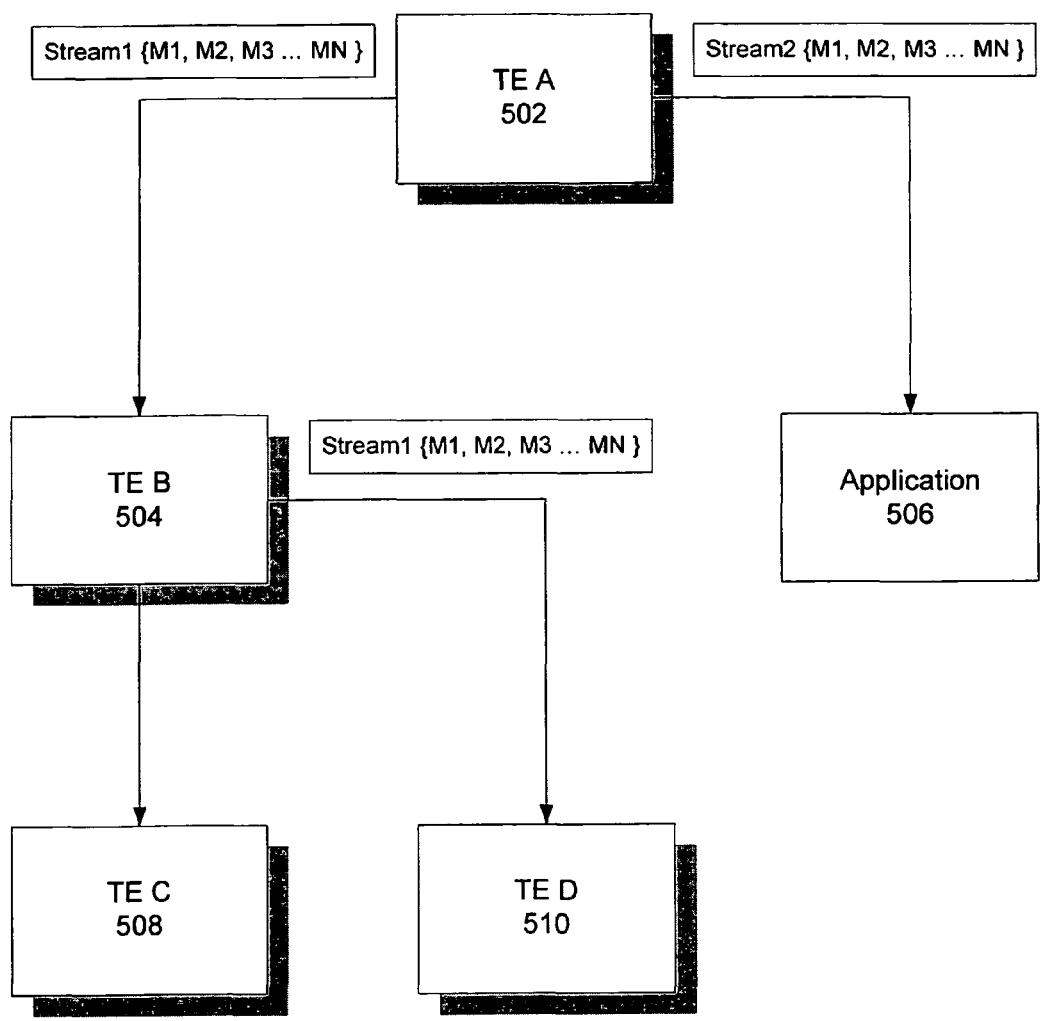
FIG. 5 presents transport-neutral in-order processing in a typical distributed network containing multiple servers and applications.

In yet another aspect, transport-neutral (as illustrated in FIGS. 3A and 3B) and in-order (as illustrated in FIGS. 1 and 2) information transfer is shown in a distributed network environment in FIG. 5. In such a distributed environment, transfer engine A 502 may be sending multiple streams of messages to various backend devices and applications. Thus, transfer engine A 502 sends stream1 to transfer engine B 504, and transfer engine B 504 in turn, relays stream1 to transfer engine D 510. Likewise, transfer engine A 502 can send a second stream, stream2, to an application 506 where this stream will be dequeued in the order in which it was received by the transfer engine 502 in the first place.

In one aspect, the entire stream of messages (M1, M2, etc.) is locked between the transfer engine B 504 and transfer engine D 510. This locking means that the entire stream1 of messages (M1, M2, etc.) will be processed through transfer engine D 510. Put another way, transfer engine C 508 will not process stream1 if it is already locked between transfer engine B 504 and transfer engine D 510. Such serialization of streams, where streams of messages are routed in their entirety through a designated transfer engine, further ensures that the messages in the streams will remain in-order as they are being transferred through a variety of transport engines or applications.

In order to function effectively in such a distributed network environment, each transfer engine has multiple send and receive ports and their accompanying transport adapters. Each of these ports can handle a variety of protocols from a variety of sources, and can in turn relay an in-order information—in the same sequence it received the information—to other backend transport engines, servers, and applications.

Figure 6:
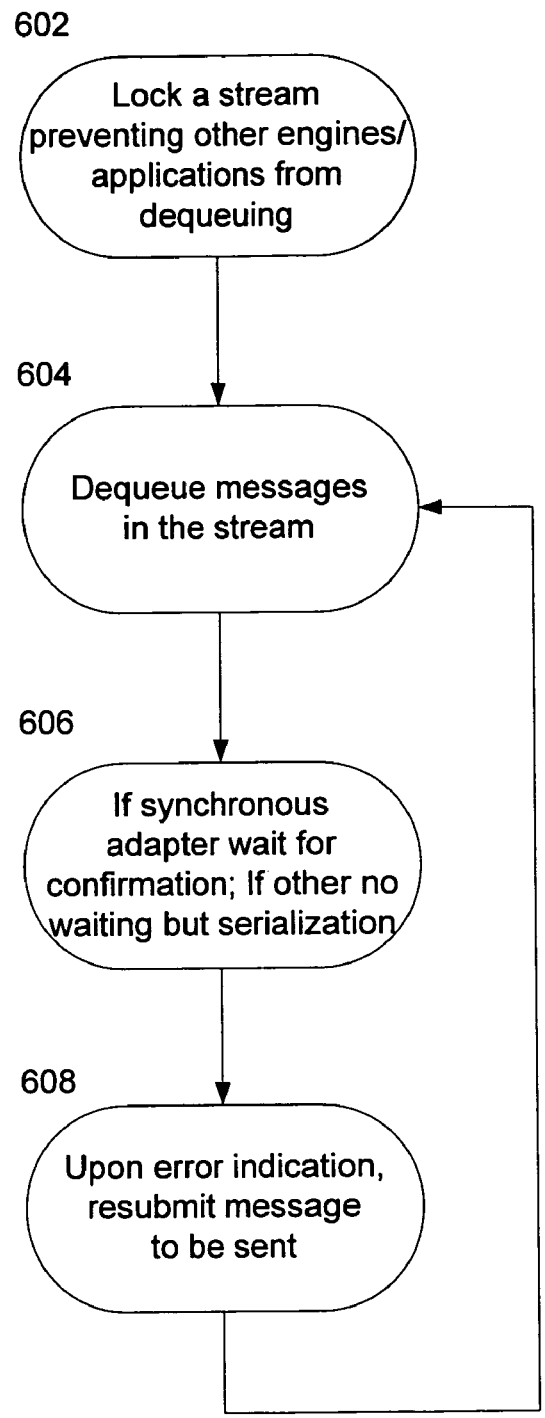
FIG. 6 presents a block diagram of a failure semantic that uses a resubmit functionality where a failed message transport is resubmitted.

In another aspect, FIG. 6 illustrates in a block diagram flowchart one type of failure semantic for sending information from one transfer engine to some backend destination. First, at block 602, a stream is being sent from one transfer engine to some backend destination. In order for the messages in the stream to remain in-order, the stream is locked so that the messages in the stream can be dequeued only to a designated backend destination and not to any other backend destination. Upon locking, only the locked on backend destination receives messages in the sequential order in which they are stored in the stream.

At block 604, the messages in the stream are dequeued by some message agent. In the example of a typical commercial transport engine, a message agent popping out messages from a persistence store message box, namely, a logically partitioned queue, pushes these messages to a send port to be sent to the downstream destination. Alternatively, if an application is stored on the same server as the transport engine, the messages can be popped off to the application without needing to send the messages via a send port.

At block 606, once a stream is locked and messages are starting to dequeue, the transport adapter type residing alongside a send port must be considered. If the transport adapter is synchronous, a message can be sent and then confirmation can be received if the message was sent successfully. If the transport adapter is of another types, for example asynchronous or batched, then such waiting is not needed. However, the messages in the locked stream between the transfer engine and the backend destination are serialized so that they are sent in-order.

Block 608 addresses the interesting question of what happens when there is an error in the message sending process. If for some reason a message in a stream could not be successfully transported from the transfer engine to the backend destination, that message might be resubmitted for either a certain period of time or for certain number of resubmission retries—it is up to a user or an administrator to specify the requirement for resubmission.

Upon resubmission, if the message in question is successfully sent, the dequeuing process can continue (hence the loop back from block 608 to block 604). However, if the resubmissions are not successful, the lock on the stream may have to be released so that another backend destination, namely, another transfer engine, server, or application, can process the stream. The stream lock is released because otherwise the backend destination computing device will be locked, idle and non-productive.

Figure 7:
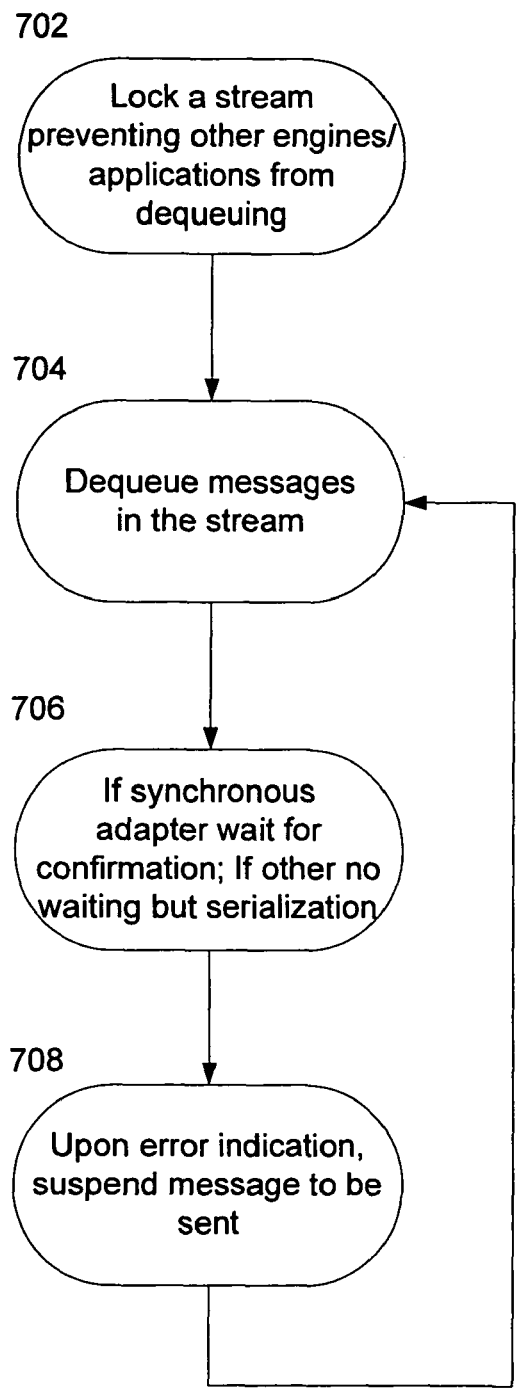
FIG. 7 presents a block diagram of a failure semantic that uses a suspend functionality where a failed message transport is suspended.

In yet another aspect, FIG. 7 illustrates a similar scenario to FIG. 6, except a different failure semantic is considered. Blocks 702, 704, and 706 correspond to blocks 602, 604, and 606 in FIG. 6, respectively. However, at block 708, upon an error message that a message in a stream was not successfully sent, the message is suspended as non-resumable. Moreover, in another aspect, not only is a particular message suspended but the entire stream associated with a failed message delivery cannot be resumed—i.e. the stream becomes non-transferable to a backend destination. Once the message is suspended, it can be examined and fixed. Until it is fixed, it is non-resumable and thus should not be transferred.

Figure 8:
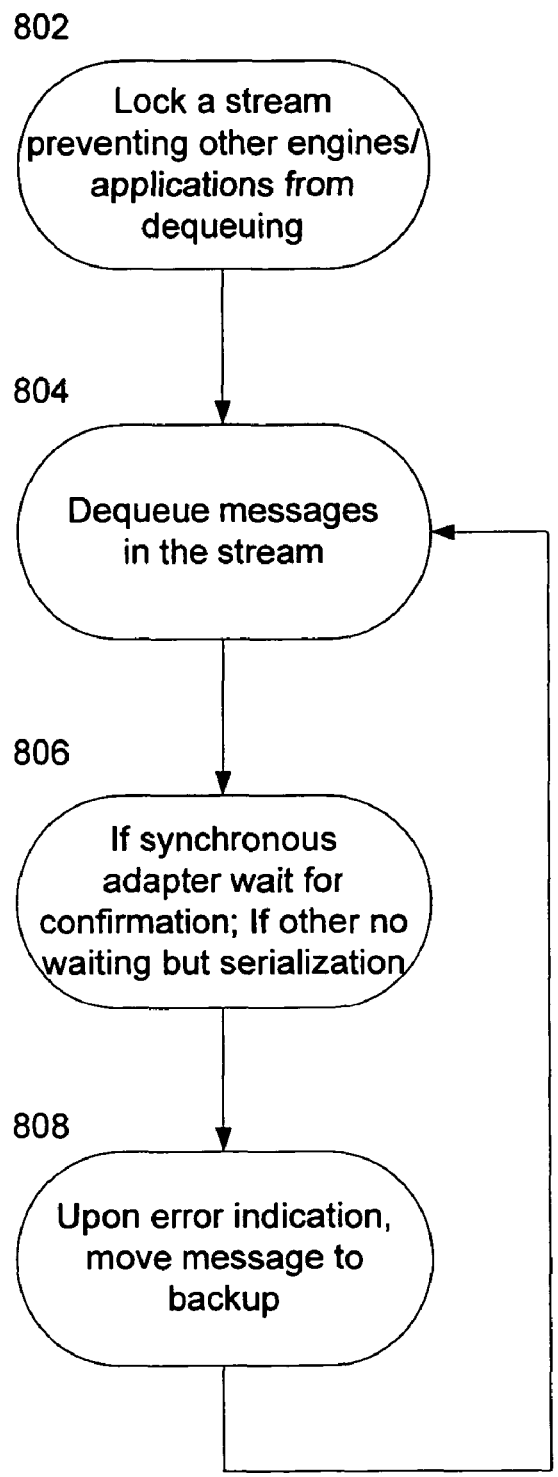
FIG. 8 presents a block diagram of a failure semantic that uses a backup functionality where a failed message transport is backed-up.

In still another aspect, FIG. 8 illustrates a similar flowchart diagram to that of FIGS. 6 and 7, however, yet another failure semantic is considered. This time, upon a failed message delivery, the message is moved to a backup location. This backup location can be stored on the same server as the transport engine is running on. The message failure can then be examined separately from any other messages in other streams.

Figure 9:
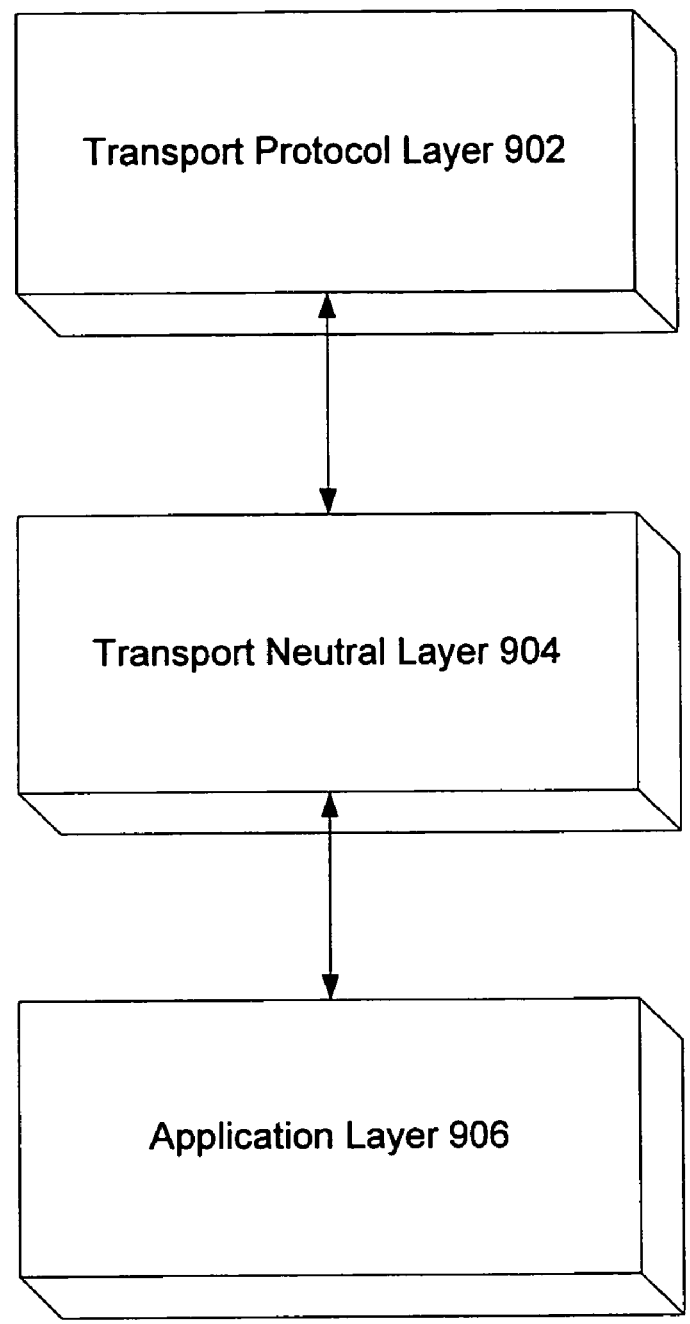
FIG. 9 presents the various layers a stream might go through when an error occurs.

In another aspect, FIG. 9 illustrates the various software layers a stream might go through when an error occurs. For example, a stream that is resubmitted or suspended might typically have to go through a transport protocol layer 902 and an application layer 906. However, in this aspect the stream goes through a transport neutral layer 904, which contains various protocols that are used either in primary or secondary fashion. It is the ability of this aspect of the invention to handle errors when various protocols may be used by various ports and yet maintain the order of messages in a stream that is advantageous. It can accomplish this task by, for example, ensuring that messages in a stream are each sent through a selected port using a specific protocol, so that when there is an error and messages need to be, say, resubmitted, the order is not broken by some messages using different protocols or being resubmitted out of order with respect to other messages.

Figure 10:
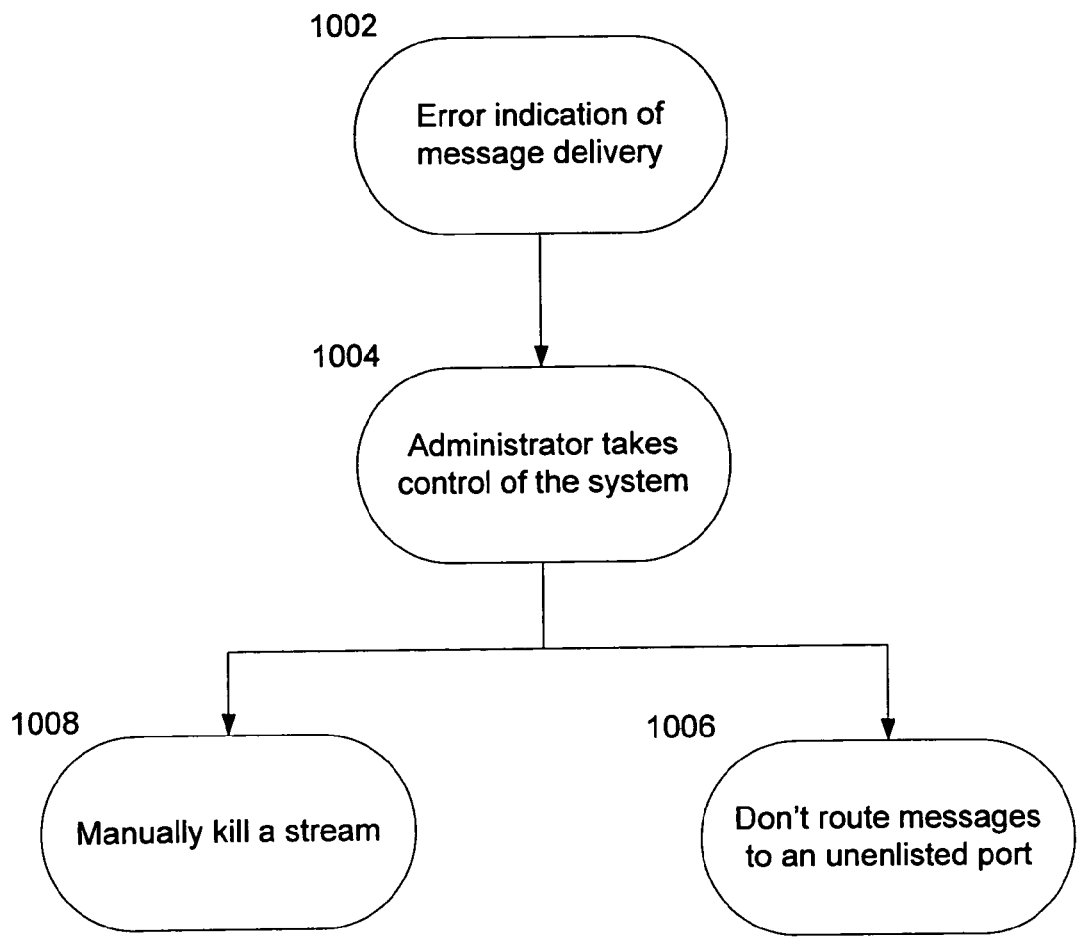
FIG. 10 presents block diagram of exemplary administrative functions that can be configured or undertaken by an administrator (or equivalently, any user)

In another aspect, FIG. 10 illustrates administrative operations that can be performed. Although it should be noted that these administrative operations could also be performed by users of the transfer engine, not just administrators. FIG. 10 happens to consider the scenario where at block 1002 there is an error indication that a message was not successfully delivered to a backend destination. At block 1004, the administrator takes control of the system in order to perform some failure handling function. For example, at block 1006, the administrator can specify ports that should be unenlisted from receiving message streams. When a receive port at some backend destination is unenlisted it will not receive any streams and other ports instead will receive messages.

At block 1008, the administrator can also manually abort or kill a stream if the messages in the stream are failing to deliver. Alternatively, the administrator can kill streams for other reasons than delivery failure, for example, to free up system resources or to withhold certain desired information transfers. These two listed administrative functionalities at blocks 1006 an 1008 are of course merely exemplary. The administrator has great leeway in configuring a transfer engine. This configurability can be embodied also in the previously discussed aspect, namely, selection of transport adapter type (HTTP, FTP, etc.) and its characteristics (synchronous, asynchronous, etc.).

Exemplary Networking Environment

Figure 11:
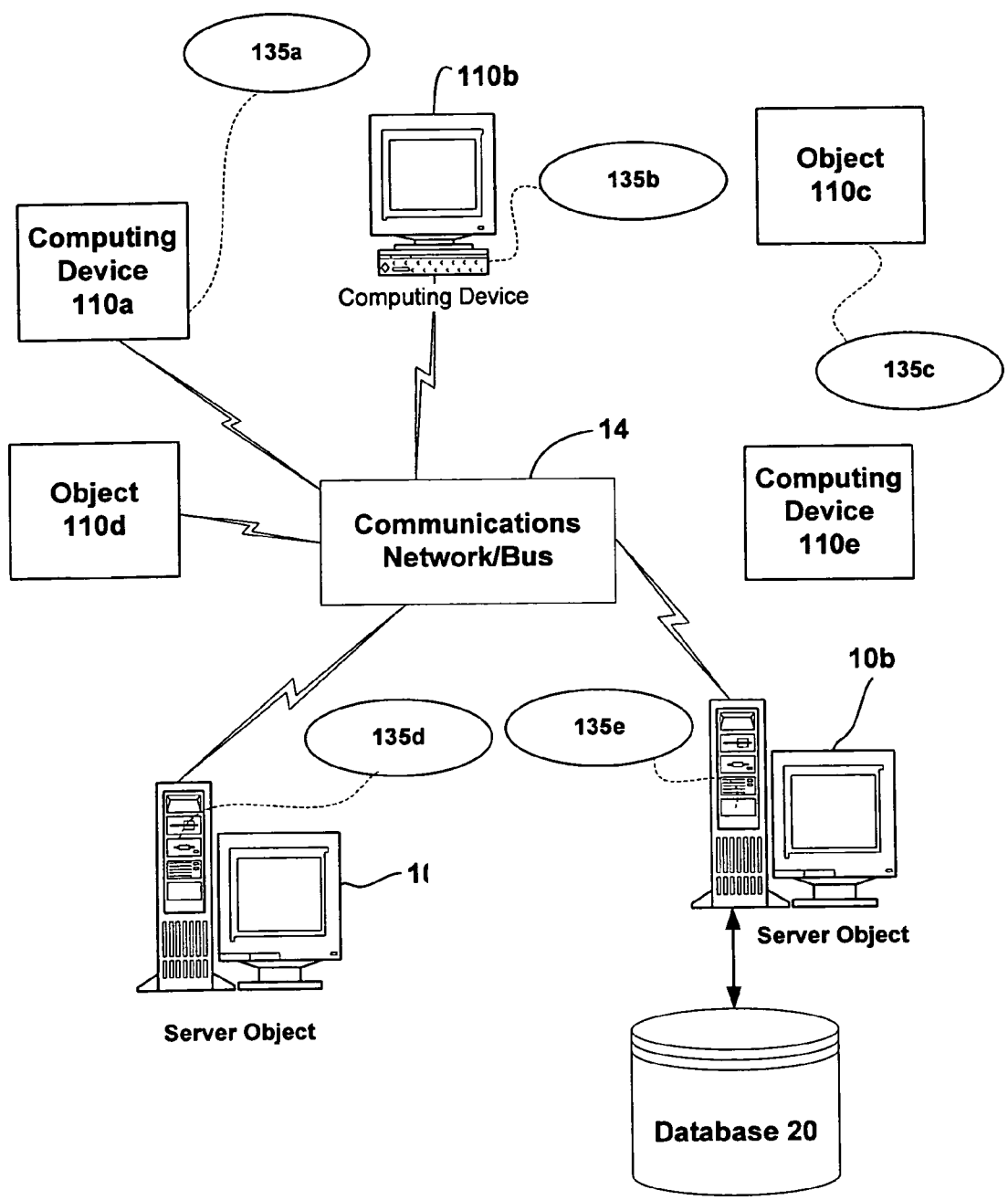
FIG. 11 presents an exemplary distributed environment in which the presently discussed aspects may be implemented.

In the preceding discussion, especially FIG. 5, the transfer engine operated in a distributed environment. FIG. 11 provides a schematic diagram of an exemplary networked or distributed computing environment. The distributed computing environment comprises computing objects 10a, 10b, etc., on any of which the transfer engine could be installed, and computing objects or devices 110a, 110b, 110c, etc. These objects may comprise programs, methods, data stores, programmable logic, or applications that take in in-order information, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 11, and may itself represent multiple interconnected networks. In accordance with one aspect, each object 10a, 10b, etc. or 110a, 110b, 110c, etc. may contain an application that might make use of an API, or other object, software, firmware and/or hardware, to request use of the processes used to implement object persistence methods.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the presently discussed aspects.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network (s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 11, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the discussed aspects.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the discussed aspects may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 11 illustrates an exemplary networked or distributed environment, with a server in communication with client computers via a network/bus, in which the presently discussed aspects may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the presently discussed aspects. It is thus contemplated that the present aspects may apply to any computing device in connection with which it is desirable to maintain a persisted object.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment 100a.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the presently discussed aspects. Thus, the present aspects can be utilized in a computer network environment 100a having client computers 110a, 110b, etc. that can access and interact with a computer network/bus 14 and server computers 10a, 10b, etc. that may interact with client computers 110a, 110b, etc. and other like devices, and databases 20.

While the present aspects have been described in connection with the preferred aspects, as illustrated in the various figures, it is understood that other similar aspects may be used or modifications and additions may be made to the described aspects for performing the same function of the present aspects without deviating therefrom. For example, in one aspect, transport-neutral in-order delivery was discussed, with various failure scenarios. However, other equivalent systems and methods to these described aspects are also contemplated by the teachings herein. Therefore, the present aspects should not be limited to any single aspect, but rather construed in breadth and scope in accordance with the appended claims.

What is claimed:

1. A system for managing the delivery of information in a distributed environment, the system comprising:
   a processor programmed to implement a transport engine comprising:
   a first port for receiving information from a plurality of sources, wherein the information includes a stream of messages having a plurality of protocols;
   a first transport adapter that supports the plurality of protocols, the first transport adapter interpreting the information and relaying the information to an endpoint manager, the endpoint manager processing the information and presenting the information to a message agent;
   a message box for receiving the information from the message agent and for queuing the stream of messages within a plurality of partitions, each of the plurality of partitions corresponding to one of a plurality of destinations;
   a second transport adapter for receiving a portion of the stream of messages queued within a first partition of the plurality of partitions, from the message box, via the message agent, and encoding each of a plurality of messages contained within the portion of the stream of messages with a same specific protocol, the specific protocol having a corresponding port;
   a second port, corresponding to the specific protocol, for sending the portion of the stream of messages to a first destination corresponding to the first partition, wherein the portion of the stream of messages is sent to the first destination in the same sequence in which the portion of the stream of messages was received at the first port, and wherein the portion of the stream of messages is locked to the first destination, wherein locking the portion of the stream of messages to the first destination causes the plurality of messages contained in the portion of the stream of messages to be processed at the first destination in an order in which the plurality of messages were received at the first destination; and
   an error handling mechanism for taking at least one action when a message in the portion of the stream of messages is not delivered to the first destination.

2. The system of claim 1, wherein the at least one action includes resubmitting the message to the first destination after a specified event.

3. The system of claim 1, wherein the at least one action includes suspending delivery of the message to the first destination.

4. The system of claim 1, wherein the at least one action includes moving the message to a backup destination.

5. The system of claim 1, wherein the at least one action includes delisting a receiving port of the first destination to prevent the message from being delivered to the receiving port.

6. The system of claim 1, wherein the first destination includes a back-end transport engine having a receiving port for receiving the portion of the stream of messages.

7. The system of claim 1, wherein the transport engine resides on a server, and wherein the first destination includes an application that resides on the same server as the transport engine.

8. A processor-implemented method for managing the delivery of information in a distributed environment, the method comprising:

the processor receiving information from a plurality of sources, wherein the information includes a stream of messages having a plurality of protocols;

the processor interpreting the information using a first transport adapter that supports the plurality of protocols;

the processor queuing the stream of messages within a plurality of partitions, each of the plurality of partitions corresponding to one of a plurality of destinations;

the processor encoding a portion of the stream of messages queued within a first partition of the plurality of partitions using a second transport adapter, each of a plurality of messages contained within the portion of the stream of messages encoded with a same specific protocol, the specific protocol having a corresponding port;

the processor sending, from the corresponding port, the portion of the stream of messages corresponding to the first partition, wherein the portion of the stream of messages is sent in the same sequence in which the portion of the stream of messages was received, and wherein the portion of the stream of messages is locked to a first destination, wherein locking the portion of the stream of messages to the first destination causes the plurality of messages contained in the portion of the stream of messages to be processed at the first destination in an order in which the plurality of messages were received at the first destination; and the processor invoking an error handling mechanism to take at least one action when a message in the stream of messages fails to arrive at the first destination.

9. The method of claim 8, wherein the at least one action includes resubmitting the message to the first destination after a specified event.

10. The method of claim 8, wherein the at least one action includes suspending delivery of the message to the first destination.

11. The method of claim 8, wherein the at least one action includes moving the message to a backup destination.

12. The method of claim 8, wherein the at least one action includes delisting a receiving port of the first destination to prevent the message from being delivered to the receiving port.

13. The method of claim 8, wherein the first destination includes a back-end transport engine having a receiving port for receiving the portion of the stream of messages.

14. The method of claim 8, wherein the stream of messages are received, queued, and sent via a transport engine residing on a server, and wherein the first destination includes an application that resides on the same server as the transport engine.

15. A computer readable storage medium bearing computer executable instructions for managing the delivery of information in a distributed environment, the computer executable instructions comprising instructions for:

receiving information from a plurality of sources, wherein the information includes a stream of messages having a plurality of protocols;

interpreting the information using a first transport adapter that supports the plurality of protocols;

queuing the stream of messages within a plurality of partitions, each of the plurality of partitions corresponding to one of a plurality of destinations;

encoding a portion of the stream of messages queued within a first partition of the plurality of partitions using a second transport adapter, each of a plurality of messages contained within the portion of the stream of messages encoded with a same specific protocol, the portion of the stream of messages containing the plurality of messages and the specific protocol having a corresponding port;

sending, from the corresponding port, the portion of the stream of messages to a first destination corresponding to the first partition, wherein the portion of the stream of messages is sent in the same sequence in which the portion of the stream of messages was received, and wherein the portion of the stream of messages is locked to the first destination, wherein locking the portion of the stream of messages to the first destination causes the plurality of messages contained in the portion of the stream of messages to be processed at the first destination in an order in which the plurality of messages were received at the first destination; and invoking an error handling mechanism for taking at least one action when a message in the portion of the stream of messages is not delivered to the first destination.

16. The computer readable storage medium of claim 15, wherein the at least one action includes resubmitting the message to the first destination after a specified event.

17. The computer readable storage medium of claim 15, wherein the at least one action includes suspending the message from delivery to the first destination.

18. The computer readable storage medium of claim 15, wherein the at least one action includes moving the message to a backup destination.

19. The computer readable storage medium of claim 15, wherein the at least one action includes delisting a receiving port of the first destination to prevent sending the message to the receiving port.

20. The computer readable storage medium of claim 15, wherein the first destination includes a back-end transport engine having a receiving port for receiving the portion of the stream of messages.

* * * * *